United States Patent [19]

Westermann

[11] Patent Number: 4,477,304

[45] Date of Patent: Oct. 16, 1984

[54] APPLICATION TOOL

[75] Inventor: Karl H. Westermann, Round Rock, Tex.

[73] Assignee: International Business Machines Corporation, Armonk, N.Y.

[21] Appl. No.: 510,046

[22] Filed: Jul. 1, 1983

[51] Int. Cl.³ .................... B32B 31/12; B32B 35/00
[52] U.S. Cl. ................................ 156/250; 156/291; 156/522; 156/526; 156/575; 156/576; 156/577; 156/578; 156/583.2
[58] Field of Search .............. 156/522, 524, 526, 527, 156/575, 576, 577, 578, 575, 583.2, 250, 291

[56] References Cited

U.S. PATENT DOCUMENTS

| | | | |
|---|---|---|---|
| 3,574,039 | 4/1971 | Fehr et al. | 156/515 |
| 3,775,219 | 11/1973 | Karlson et al. | 156/526 |
| 3,964,835 | 6/1976 | Elgenmann | 156/526 |
| 4,328,061 | 5/1982 | Off et al. | 156/522 |
| 4,387,002 | 6/1983 | Knecht | 156/578 |

OTHER PUBLICATIONS

EN877-0457, "Flat Wire Feeder," F. W. Chapin and G. S. Mariano, IBM Technical Disclosure Bulletin, vol. 21, No. 2, Jul. 1978, pp. 511-512.

Primary Examiner—Michael Wityshyn
Attorney, Agent, or Firm—Douglas H. Lefeve

[57] ABSTRACT

A tool, particularly adapted for use with a computer controlled robot includes an adhesive application device for depositing a quantity of liquid adhesive to a work piece, a transport roller for engaging the elongated material with the deposited adhesive on the work piece and about which the elongated material may be fed, and a separation means for severing a predetermined applied length of the elongated material from the supply of such material. The position of a pinch roller relative to the elongated material and transport roller is remotely controlled to provide holding of the elongated material during adhesive application, tacking, and cutting, and feeding of the material between tacking and cutting.

8 Claims, 7 Drawing Figures

APPLICATION TOOL

TECHNICAL FIELD

This invention relates generally to the application of an elongated material to a work piece and more particularly to a tool and technique for engaging a length of elongated material onto a quantity of adhesive deposited on the work piece and separating the length of elongated material from a supply of such material.

BACKGROUND ART (PRIOR ART)

Representative of the closest known prior art is an article in the *IBM Technical Disclosure Bulletin* entitled "Flat Wire Feeder" by F. W. Chapin, et al, Volume 21, No. 2, pages 511-12 (July 1978). In this article a feeder tool feeds flat wire, such as wire ribbon, between bonding sites of a printed circuit board or the like. The wire ribbon is fed from a spool through a pair of rollers to an end portion of the tool. The end portion of the tool includes a device for cutting the wire ribbon from its supply spool.

A requirement has been presented to automatically apply strips of acoustical, sound absorbing material to the inside covers of office machines during their manufacture. With programmable robot technology being increasingly employed in the manufacture of business machines it would be desirable to utilize a robot driven tool to apply these strips of acoustical foam material to the insides of the covers of the office machines. However, in attempting to choose a tool from known prior art devices, such as the flat wire feeder described in the publication referenced above, certain shortcomings in these prior art tools are apparent. For example, in the publication referenced above, a bonding device to bond the flat wire to the printed circuit board is suggested, but not shown. Such a bonding operation in the concept of this publication seems to be a separate operation unrelated to the feeder tool operation shown and described. In applying the strips of acoustical foam it became desirable to place adhesive on the work piece and then place the acoustical foam atop the adhesive so that the adhesive could form a bond between the acoustical foam and the work piece. Thus, bonding could not be accomplished as suggested by the publication, as a step in the process to be accomplished after the strip material is placed in its bonding position relative to the work piece. In view of these kinds of shortcomings the wire feeder described in the publication could not be readily utilized for the attachment of strips of acoustical foam material inside the covers of office machines with the assistance of robotics technology.

It would, therefore, be desirable to have a tool and technique for automatically applying a length of elongated material to a work piece from a supply of such material in which a quantity of adhesive is deposited onto the work piece and means are provided for engaging the length of material to the adhesive, and, therefore, the work piece, and for separating the length of material from the supply of such material.

DISCLOSURE OF THE INVENTION

Accordingly, an efficient and economical tool and technique are provided for applying an elongated material from a supply of such material to a work piece by the combination of a device for depositing a quantity of liquid adhesive to a work piece and a structure for engaging the elongated material with the deposited adhesive, over which said strip material can also be fed in a continuous manner. Additionally included is a means for separating a length of the elongated material from the supply of the elongated material. The tool and technique are particularly adaptable to computer controlled robot devices which can provide appropriate movement, including rotation, to the tool to facilitate the operation of the adhesive application device, the structure for engaging the strip material with the deposited adhesive and feeding the elongated material and with the separation means for separating a length of the elongated material from the supply of such material.

More particularly, an adhesive applicator reservoir with a pressure activated adhesive deposition tip is attached to the tool of this invention. The tool may be rotated by the computer controlled robot so that the tip of the adhesive applicator reservoir is depressed onto the work piece at a controlled pressure for a controlled length of time to deposit a predetermined amount of adhesive. During this time the supporting structure of a pinch roller, to which structure the adhesive applicator reservoir is attached, is selectively positioned by the action of one or more fluid operated actuators so that the pinch roller supported thereby provides a compressive clamping force to the end of a supply of elongated material which end is positioned between the pinch roller and a transport roller. After the adhesive application steps the tool is rotated, (but in a direction opposite to that required for adhesive application) and moved toward the work piece to compress the end of the strip material onto the deposited adhesive so that the strip material is pressed into contact with the adhesive by the transport roller. At this time the compressive force provided by the pinch roller is released by operation of the fluid operated actuator and relative movement between the work piece and the tool allows the elongated material to feed onto the work piece. Additional cycles of applying adhesive, engagement of the elongated material with the adhesive, and further feeding of the elongated material can be accomplished. Finally, the pinch roller can again be moved into compressive engagement with the elongated material and additional rotation of the tool can be provided to interpose a separation device, such as a heated, severing device between the length of elongated material applied to the work piece and the supply of such material.

The foregoing and other objects, features, extensions, and advantages of the invention will be apparent from the following more particular description of preferred embodiments of the invention, as illustrated in the accompanying drawing.

BEST MODES FOR CARRYING OUT THE INVENTION

Figure 1:
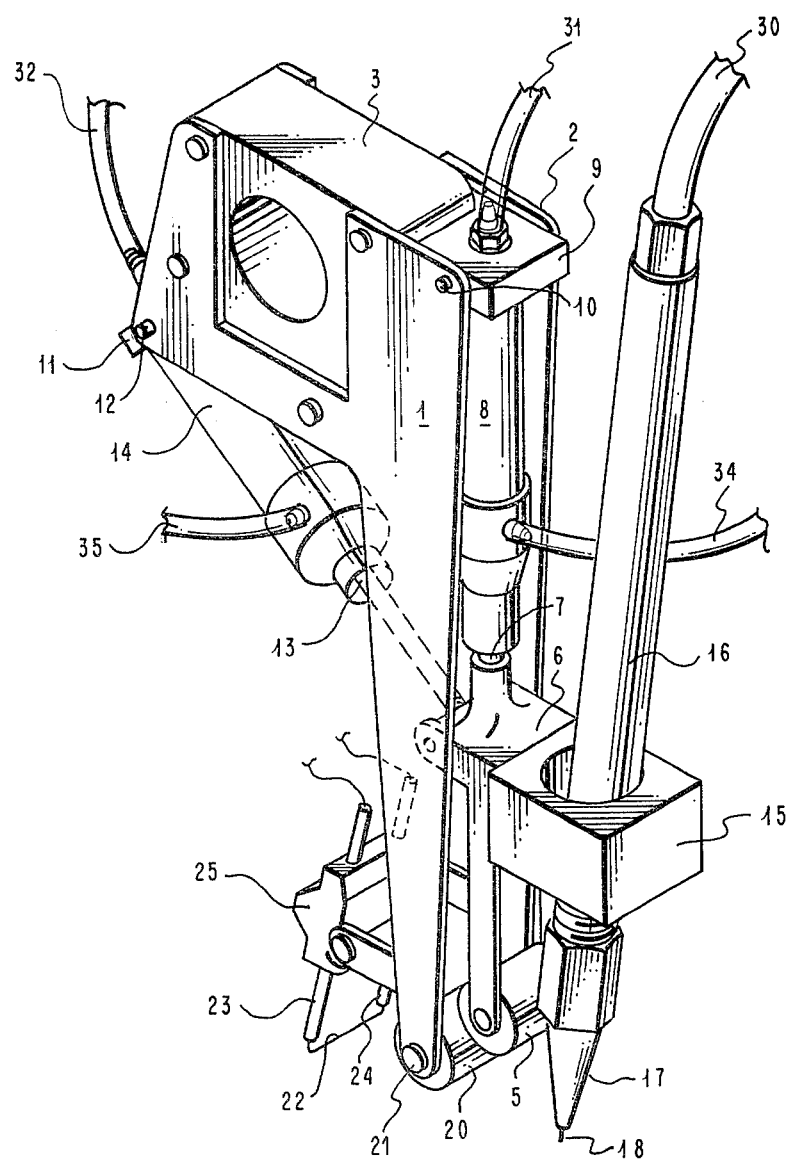
FIG. 1 is a perspective view of the tool of this invention for applying elongated material to a work piece.

Referring now to FIG. 1 the tool of this invention is shown in a perspective view including frame members 1 and 2 thereof, oppositely disposed and each rigidly mounted to an attachment block 3. Attachment block 3 is suitably adapted for engagement with, and movement by, a controllable, moveable apparatus, such as a robot arm. A pinch roller 5 is held rollably captive by a pinch roller yoke 6. Yoke 6 is rigidly attached to a piston rod 7 of a fluid operated actuator 8. Actuator 8 is rigidly attached to a pivot block 9 which pivot block is pivotably mounted via pin 10 through frame members 1 and 2 so that block 9, actuator 8, piston rod 7, yoke 6, and roller 5 may rotatably pivot about an axis defined by pin 10.

Actuator 8 provides linear movement of the position of roller 5 with respect to a position along the extension of a line defined by the travel of rod 7. Another fluid operator actuator 14 has one end thereof rigidly attached to a pivot block 11 which is pivotably mounted by pin 12 through frame members 1 and 2 to allow rotation of block 11 and actuator 14 with respect to an axis defined by pin 12. The piston rod 13 of actuator 14 is pivotably mounted to yoke 6 so that inward and outward movement of rod 13 causes angular movement of the axis of pinch roller 5 with respect to a center of rotation defined by pin 10.

Also rigidly attached to yoke 6 is an adhesive applicator reservoir mounting block 15 through which an adhesive applicator reservoir 16 is rigidly attached. The lower end of applicator reservoir 16 is a pressure activated adhesive deposition tip 17 having a pin 18 at the extremity thereof which, when depressed, allows adhesive to flow therethrough. The amount of adhesive deposited is proportional, within a linear range, with the extent of the depression of pin 18 and also the length of time pin 18 is depressed.

At the lower end of frame members 1 and 2 is freely rotatable transport roller 20 having an axis defined by pin 21. A heating element wire 22 for severing the elongated material applied with the aid of this tool is mounted between a pair of electrical terminals 23 and 24, which terminals are mounted through an insulating block 25. Block 25 is attached to the lower end of frame members 1 and 2.

A liquid adhesive may be dispensed into adhesive applicator reservoir 16 through a supply tube 30 under pressure. A suitable fluid (air or hydraulic fluid) may be introduced into supply tubes 31 and 32 to cause movement of piston rods 7 and 13, respectively, out of actuators 8 and 14, respectively. Such a fluid may be introduced into supply tubes 34 and 35 to cause the withdrawal of piston rods 7 and 13, respectively, into actuators 8 and 14, respectively.

Figure 2:
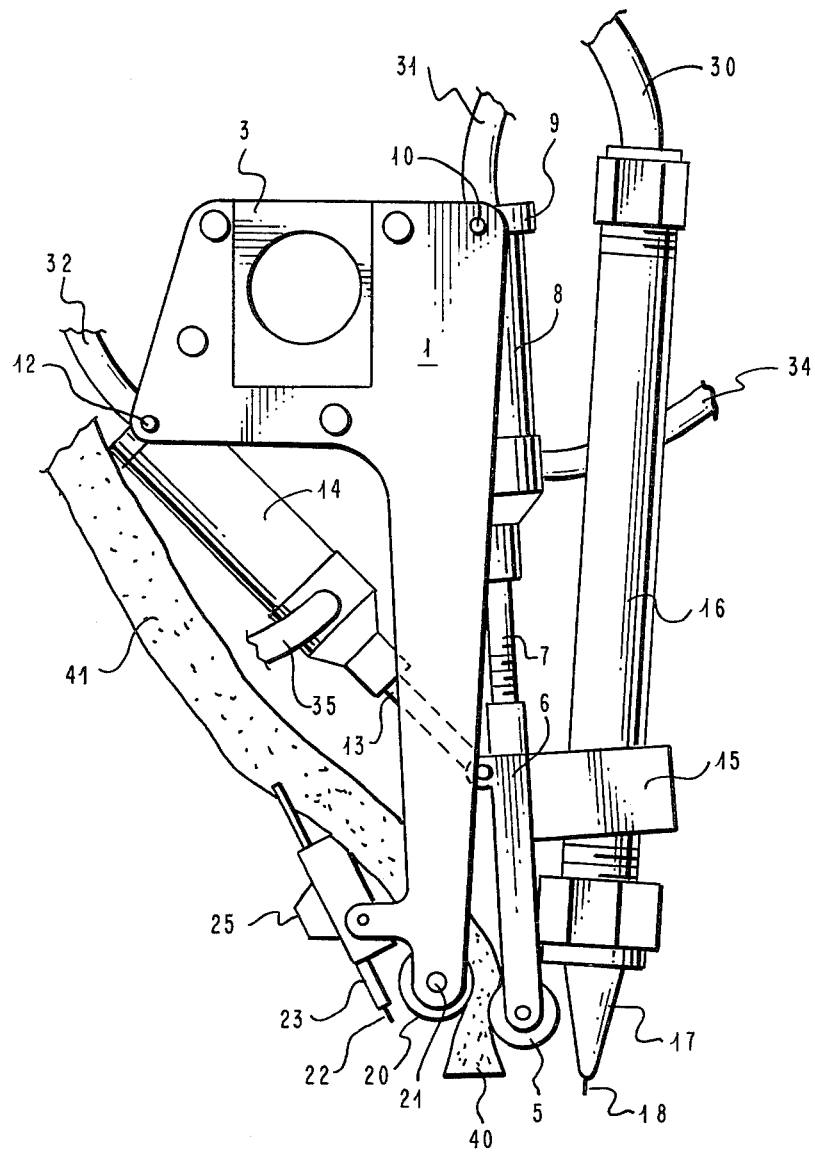
FIG. 2 is a side view of the tool of this invention shown in its starting position.

Referring now to FIG. 2, a side view of the tool of this invention is shown in its starting position. An end 40 of an elongated material 41, such as acoustical foam, is shown being compressed between rollers 5 and 20 and held in a captive position thereby. This compression is established by the operation of actuators 8 and 14 to cause pinch roller 5 to compress the elongated material between roller 5 and roller 20. The remainder of the elongated material 41 may be, for example, rolled on a supply spool or otherwise stored in a continuous form and made available for feeding through the tool of this invention onto a work piece.

Figure 3:
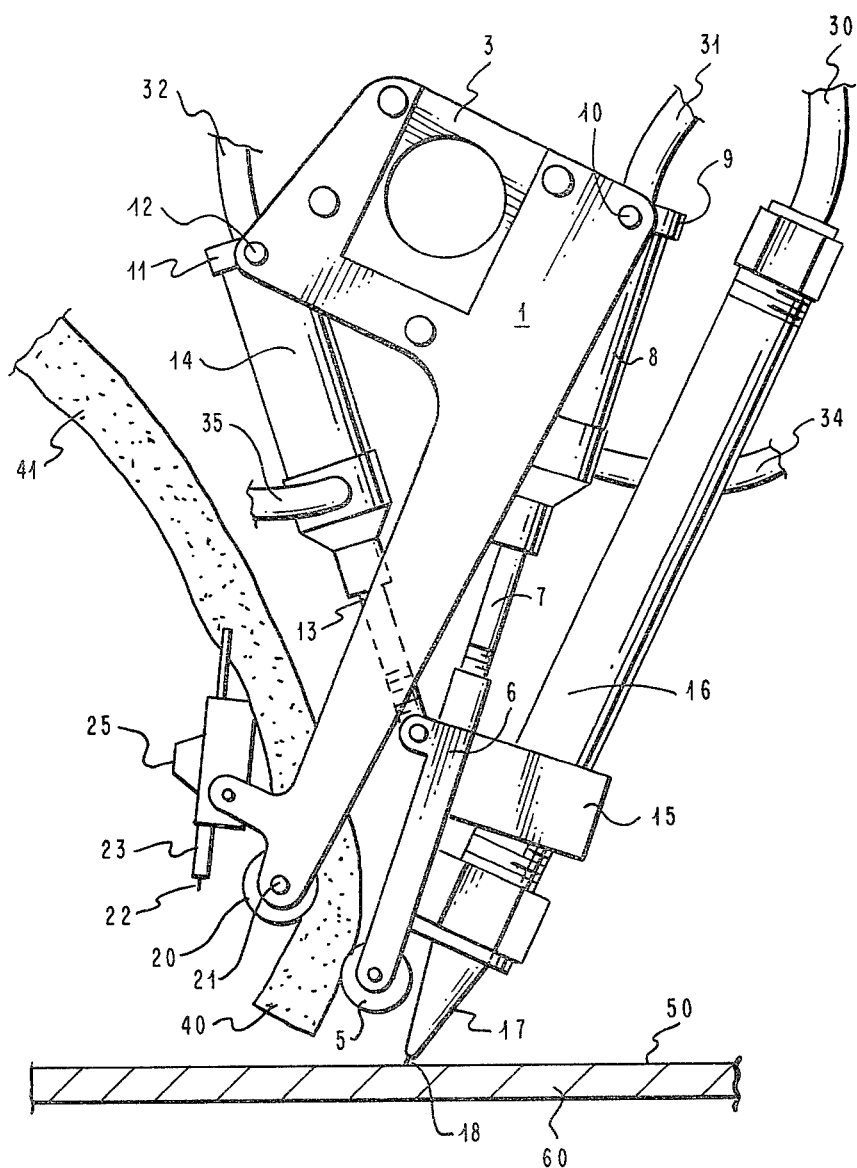
FIG. 3 is a side view of the tool of this invention shown in a position to apply adhesive to the work piece.

In FIG. 3 the tool has been temporarily rotated into position so that pin 18 of the adhesive deposition tip 17 is engaged against a surface 50 of a work piece 60 to allow a quantity of adhesive to flow through the end of tip 17 onto the surface of work piece 60 during the time that pin 18 is engaged against surface 50.

Figure 4:
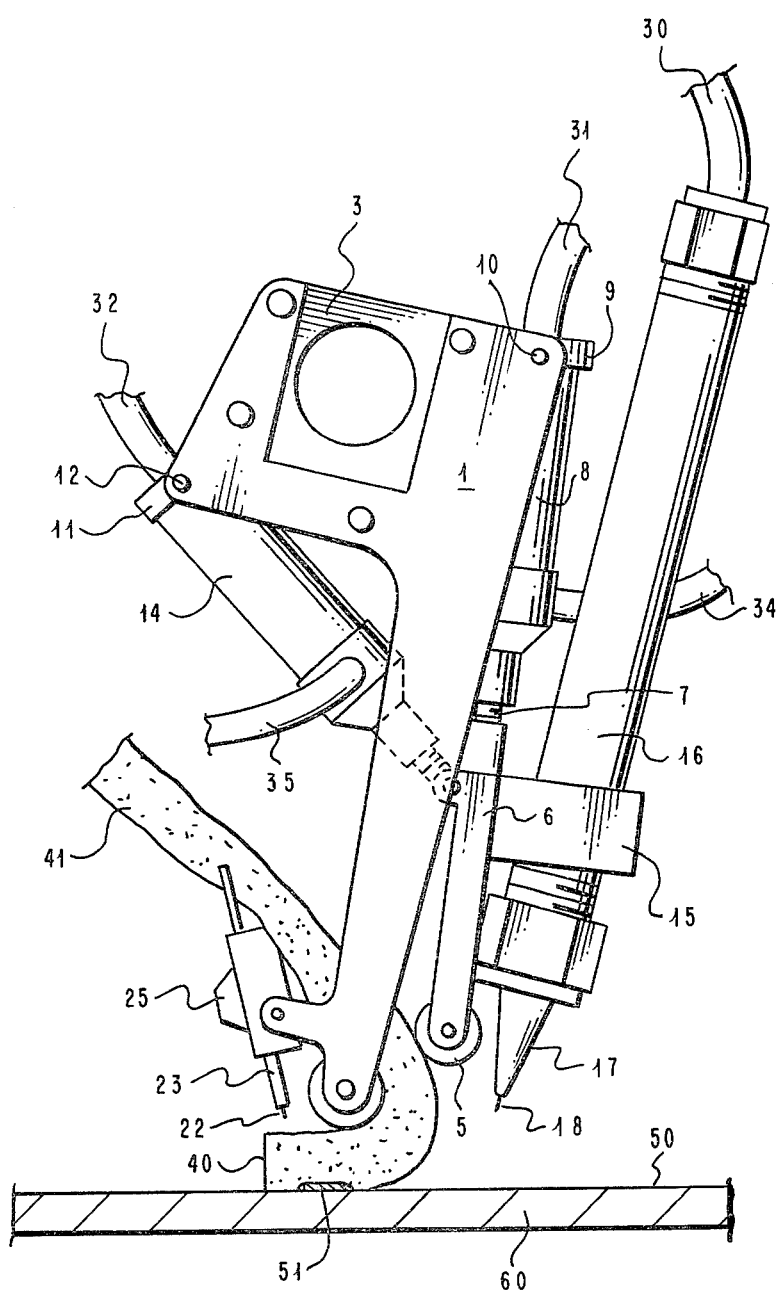
FIG. 4 is a side view of the tool of this invention shown in a position to engage the elongated material with the applied adhesive.
Figure 5:
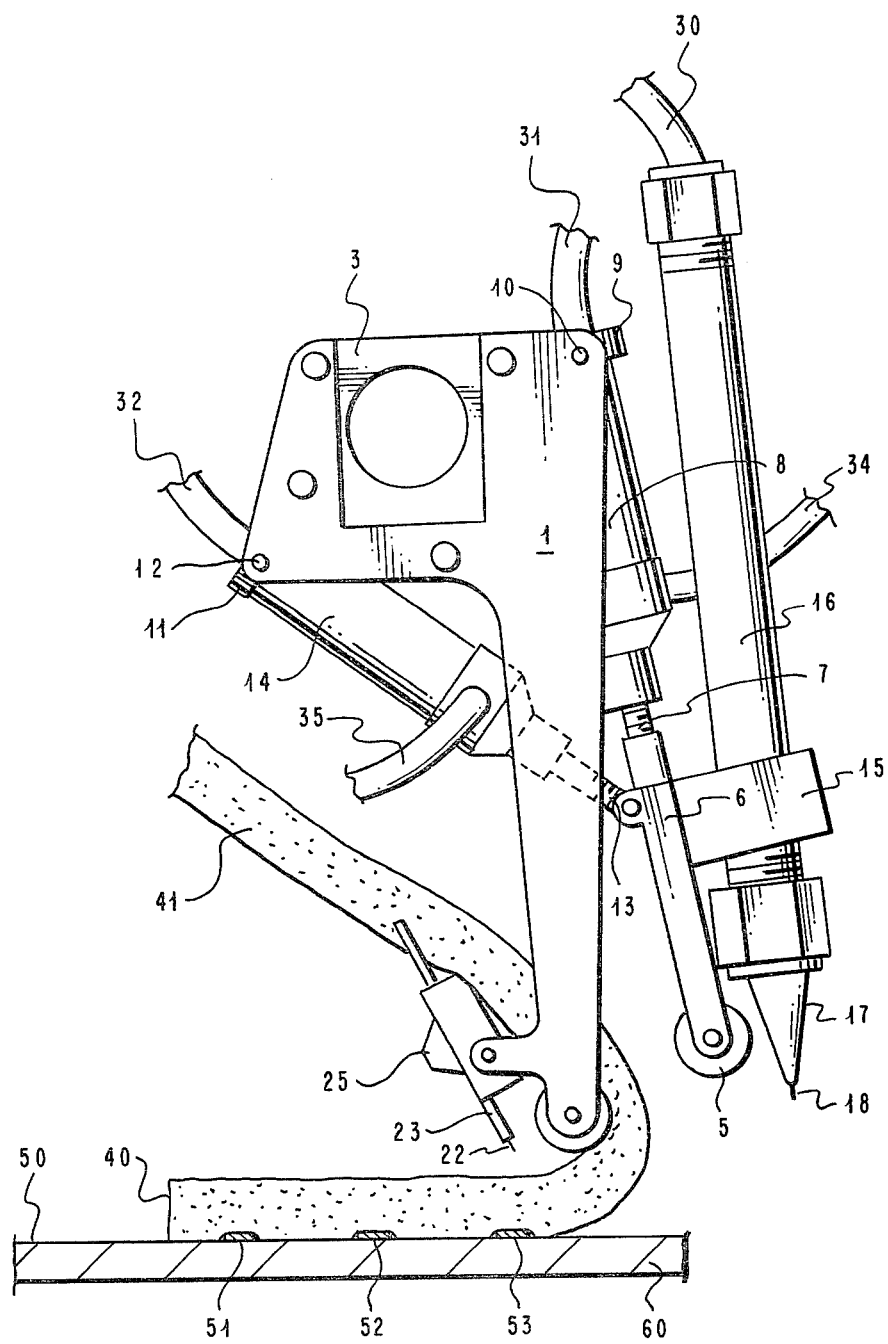
FIG. 5 is a side view of the tool of this invention shown in a position appropriate for feeding the elongated material between tack points.
Figure 6:
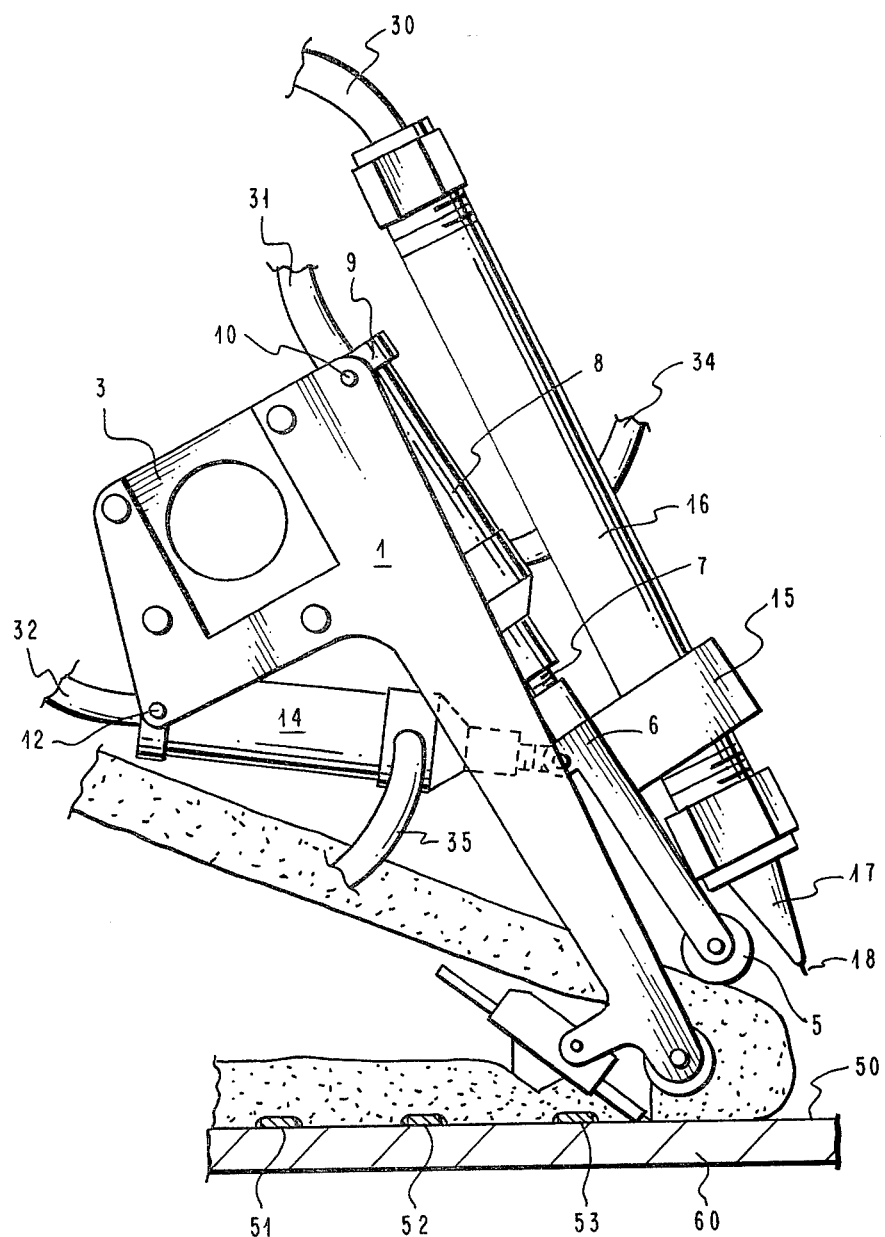
FIG. 6 is a side view of the tool of this invention shown in a position for separating a length of elongated material from the supply of the elongated material.

In FIG. 4 the tool is rotated opposite to the direction necessary for adhesive dispensing and the transport roller 20 causes engagement with the end 40 of elongated material 41 at the position 51 at which the adhesive was dispensed. Any downward motion required for this engagement as well as any necessary relative motion of the tool to the work piece to properly position the end 40 of elongated material 41 over the position of adhesive application may be accomplished by a programmable robot arm to which the tool of this invention can be attached, as is well known by those skilled in the art. At the completion of this operation described with respect to FIG. 4 the actuators 8 and 14 are operated to cause repositioning of the pinch roller 5 to loosen the engagement of pinch roller 5 relative to the surface of the elongated material 41. Depending on the nature of elongated material being fed, pinch roller 5 may or may not continue to positively engage the elongated material. By removing this compressive holding force provided by pinch roller 5 against the elongated material, the material 41 becomes free to be pulled over a transport roller 20 during relative movement between the tool and the surface 50 of the work piece. As shown in FIG. 5, three cycles of adhesive applications have been accomplished with feeding of the elongated material onto the work piece between applications of the adhesive. Thus, the elongated material is tacked down along the surface 50 of the work piece 60, at positions 51, 52, and 53 without continuous adhesive bonding.

For termination of the application of a length of the elongated material 41 to the surface 50 of work piece 60 the tool is rotated further opposite to the rotation needed for adhesive application while a current is simultaneously applied through the electrical heating element wire 22 which severs the applied length of elongated material from the supply source of such material by melting. It will, of course, be obvious to those skilled in the art that other separation means could be provided at this position, such as a knife blade. It will also be noted that actuators 8 and 14 have been operated to reposition the pinch roller 5 to compress the elongated material 41 so that it will not have to be rethreaded through the rollers 5 and 20 to begin application of another length of the elongated material 41.

Figure 7:
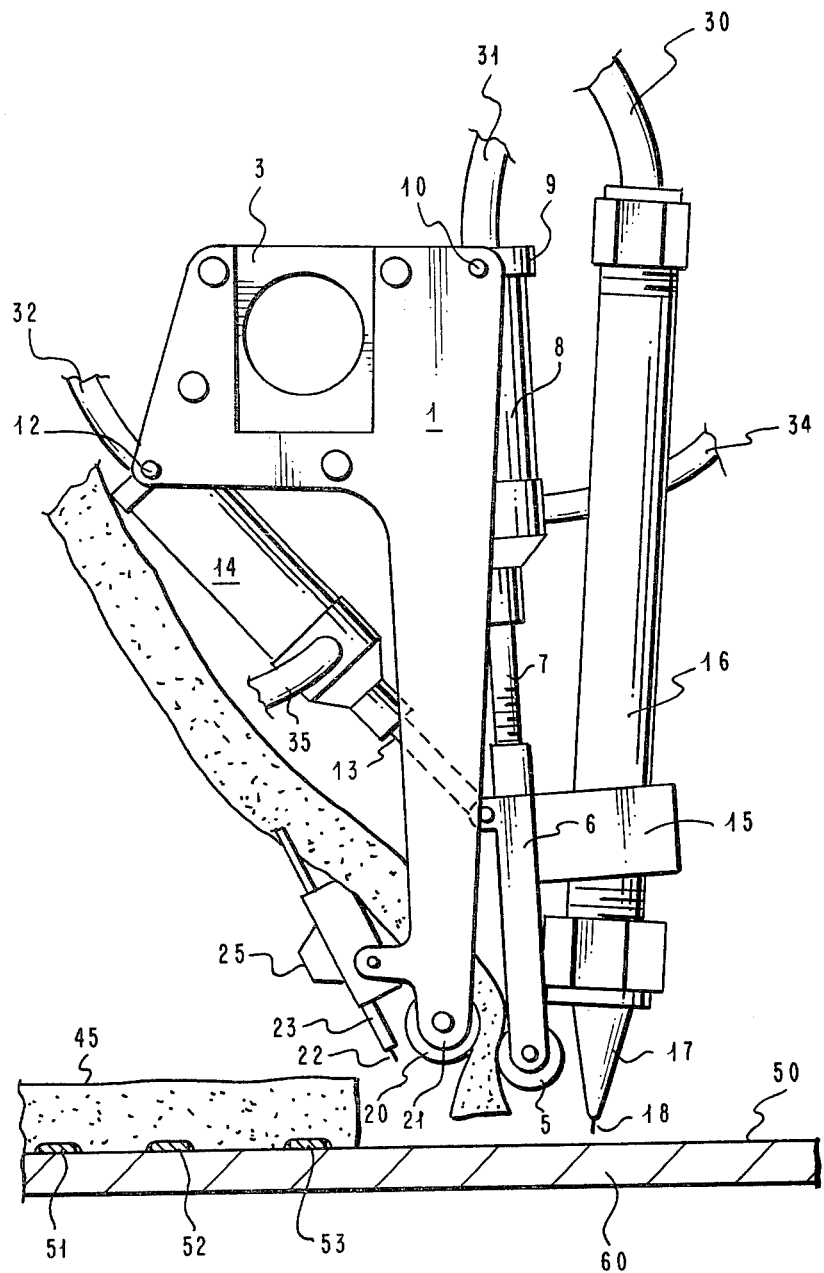
FIG. 7 is a side view of the tool of this invention shown in its start position adjacent to an applied length of elongated material.

After separating the length of applied elongated material from the supply of such material, FIG. 7 shows the tool repositioned at the start of this cyclical operation. In FIG. 7 it will be observed that a length 45 of the elongated material has been attached to the surface 50 of the work piece 60 in accordance with this cyclical operation of applying adhesive, tacking the elongated material to the portion of applied adhesive, feeding the material a predetermined distance, retacking and feeding the material a successive number of times in this manner, and finally separating the material from the supply of elongated material.

In summary, an efficient and economical tool and technique are provided for applying a length of elongated material to a work piece in a cyclical manner by utilizing a tool which combines a device for depositing a quantity of liquid adhesive to the work piece and a structure for engaging the elongated material with the deposited adhesive. The strip material can be successively applied and tacked to the work piece with the same tool. A means is also included on the tool for separating a portion of the elongated material from the supply of such material.

While the invention has been shown and described with reference to particular embodiments thereof, it will be understood by those skilled in the art that the foregoing and other changes in form and details may be made therein without departing from the spirit and scope of the invention. For example while the tool of this invention has been described with reference to the application of acoustical foam material, it will be understood by those skilled in the art that the tool can be used for the application of a great variety of elongated materials, including but not limited to insulation, gasketing, shielding, molding, trim, and decals, to name a few.

I claim:

1. In a process for applying an elongated material from a supply of such material to a work piece, the improvement comprising:
   threading said elongated material around a transport roller for travel thereabout;
   depositing a limited area of liquid adhesive to said work piece;
   engaging said elongated material with a portion of said limited area of said liquid adhesive by movement of said transport roller into a first position whereby said elongated material is compressed between said roller and said work piece;
   feeding said elongated material beyond said limited area by providing relative movement of said tool and said work piece, with said transport roller in a second position whereby said elongated material is not compressed between said roller and said work piece; and
   separating a length of said elongated material from said supply of said elongated material.

2. In a tool for applying an elongated material from a supply of such material to a work piece, the improvement comprising:
   a transport roller about which said elongated material travels between said roller and said work piece;
   means for moving said transport roller into a first position whereby said elongated material is compressed between said roller and said work piece and into a second position whereby said elongated material is not compressed between said roller and said work piece;
   adhesive application means for depositing a limited area of liquid adhesive to said work piece;
   means for engaging said elongated material with a portion of said limited area of liquid adhesive by movement of said transport roller into said first position;
   means for feeding said elongated material beyond said limited area with said transport roller in said second position; and
   means for separating a length of said elongated material from said supply of said elongated material.

3. In the tool of claim 2 wherein said means for separating further comprises a pinch roller operable to compress said elongated material against said transport roller to inhibit further feeding of said elongated material about said transport roller; and severing means for disconnecting a length of said elongated material from said supply of such material, whereby an end of said supply of elongated material is retained between said pinch roller and said transport roller.

4. In the tool of claim 3 wherein said pinch roller means is moved by at least one fluid operated cylinder.

5. In the tool of claim 3 wherein said adhesive application means further comprises an adhesive application reservoir attached to said tool.

6. In the tool of claim 5 wherein said adhesive application reservoir means further comprises means associated with said reservoir for dispensing said adhesive onto said work piece when a tip of said adhesive application reservoir is applied to said work piece.

7. In the tool of claim 6 further comprising means for moving said tool with said associated reservoir into contact with said work piece.

8. In the tool of claim 7 wherein said severing means further comprises heating means for melting said length of elongated material apart from said supply of such material.

* * * * *